Sept. 4, 1934.  M. HENTER  1,972,589
INTERNAL COMBUSTION ENGINE
Filed Feb. 11, 1929   6 Sheets-Sheet 1
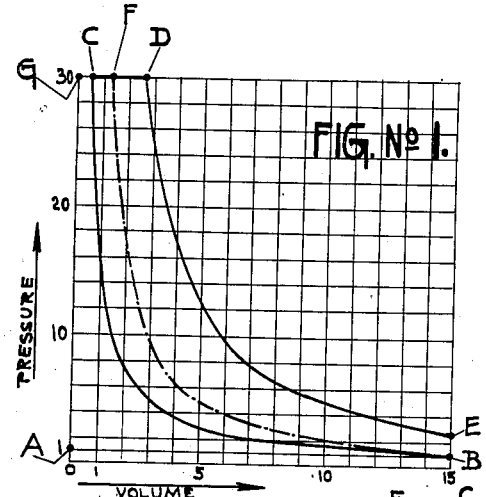
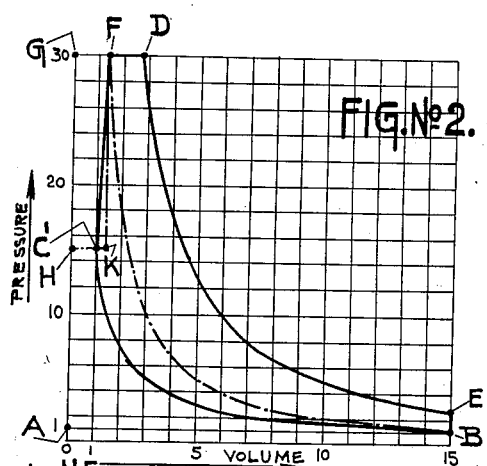
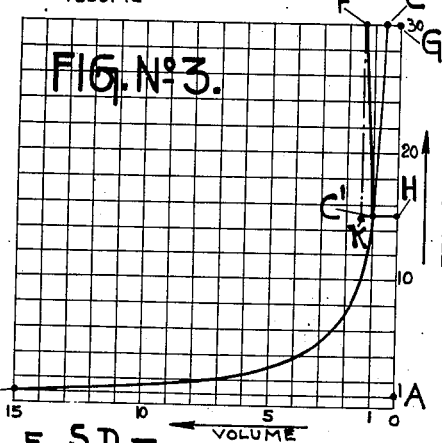
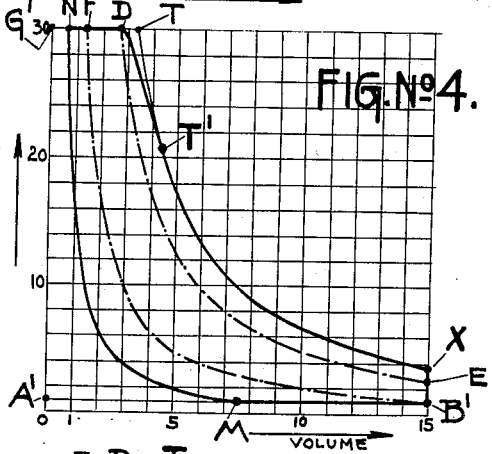
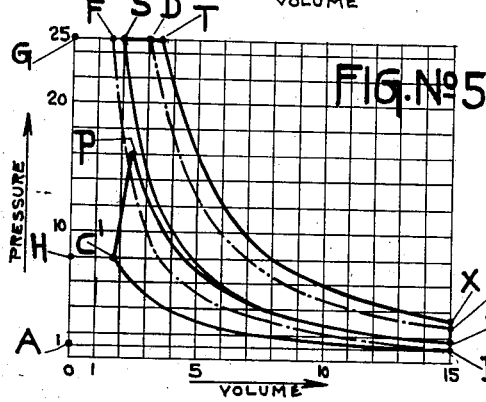
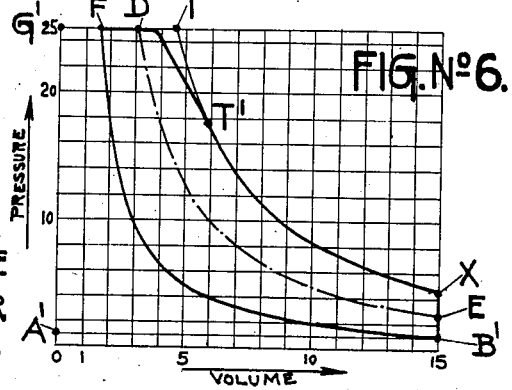

Sept. 4, 1934.    M. HENTER    1,972,589
INTERNAL COMBUSTION ENGINE
Filed Feb. 11, 1929    6 Sheets-Sheet 2
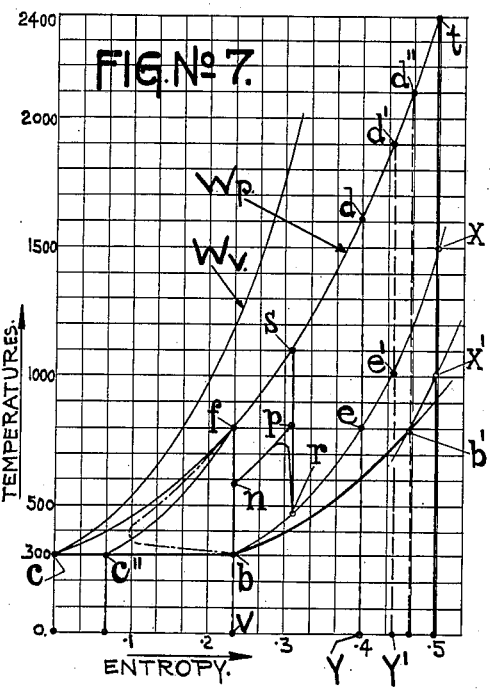
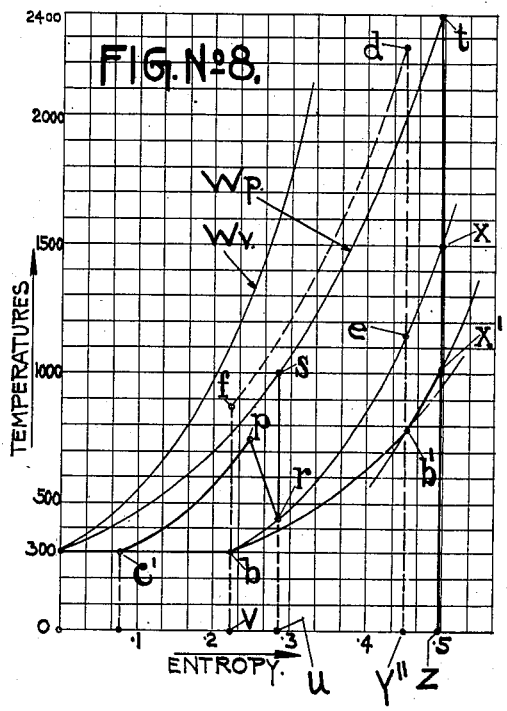
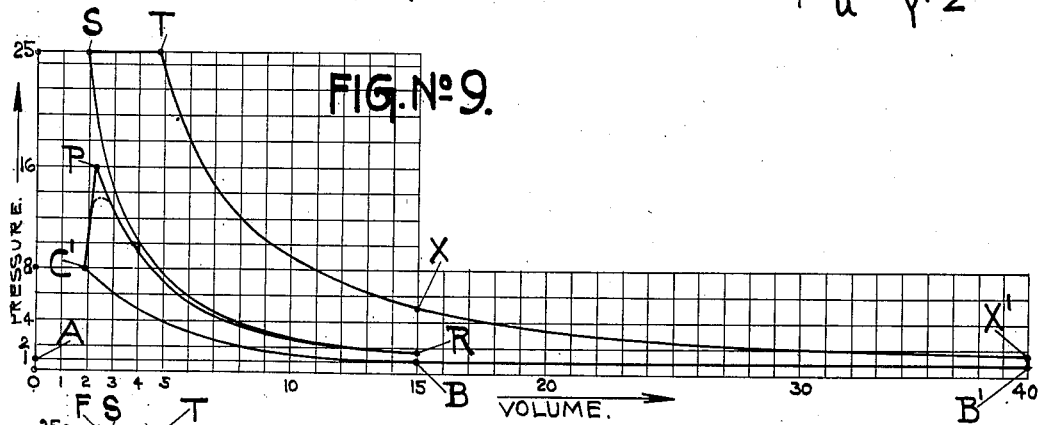
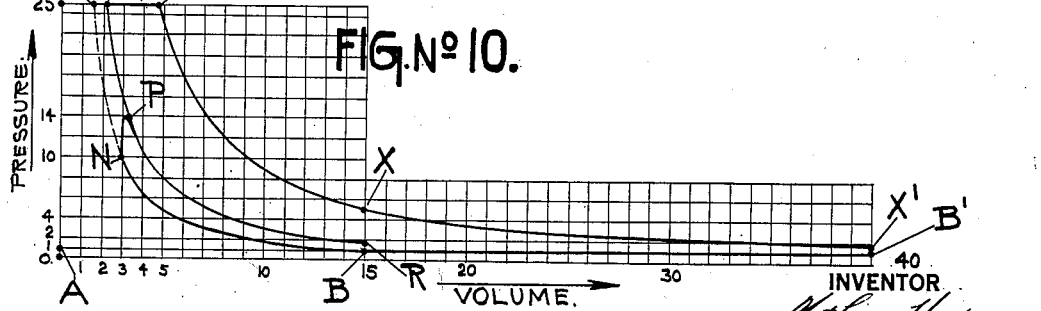

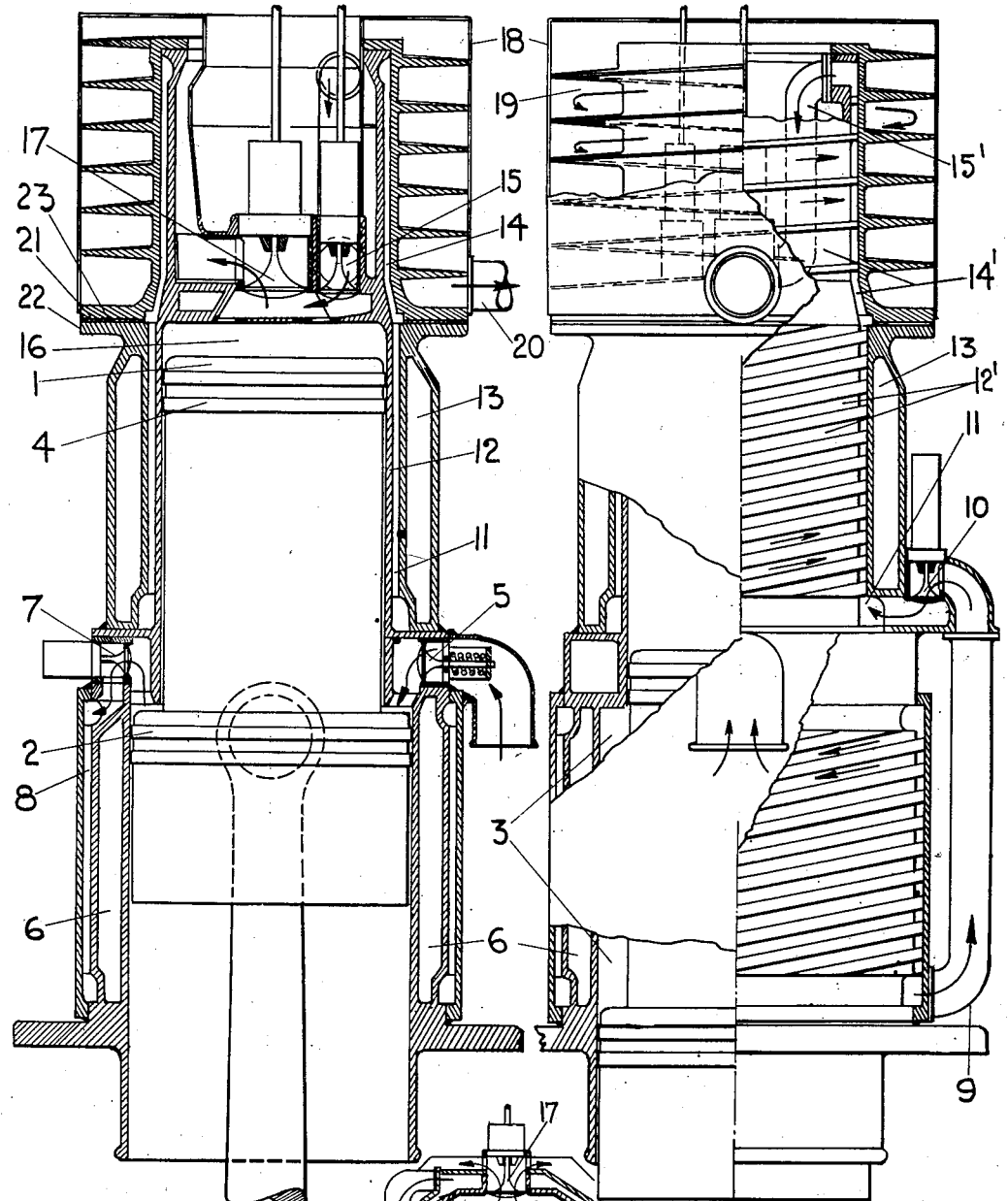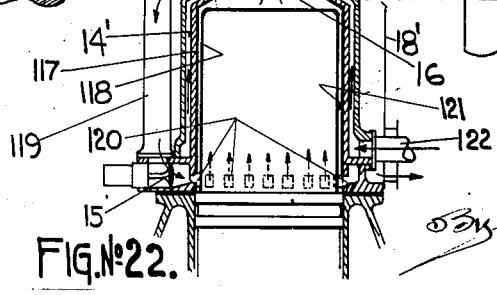

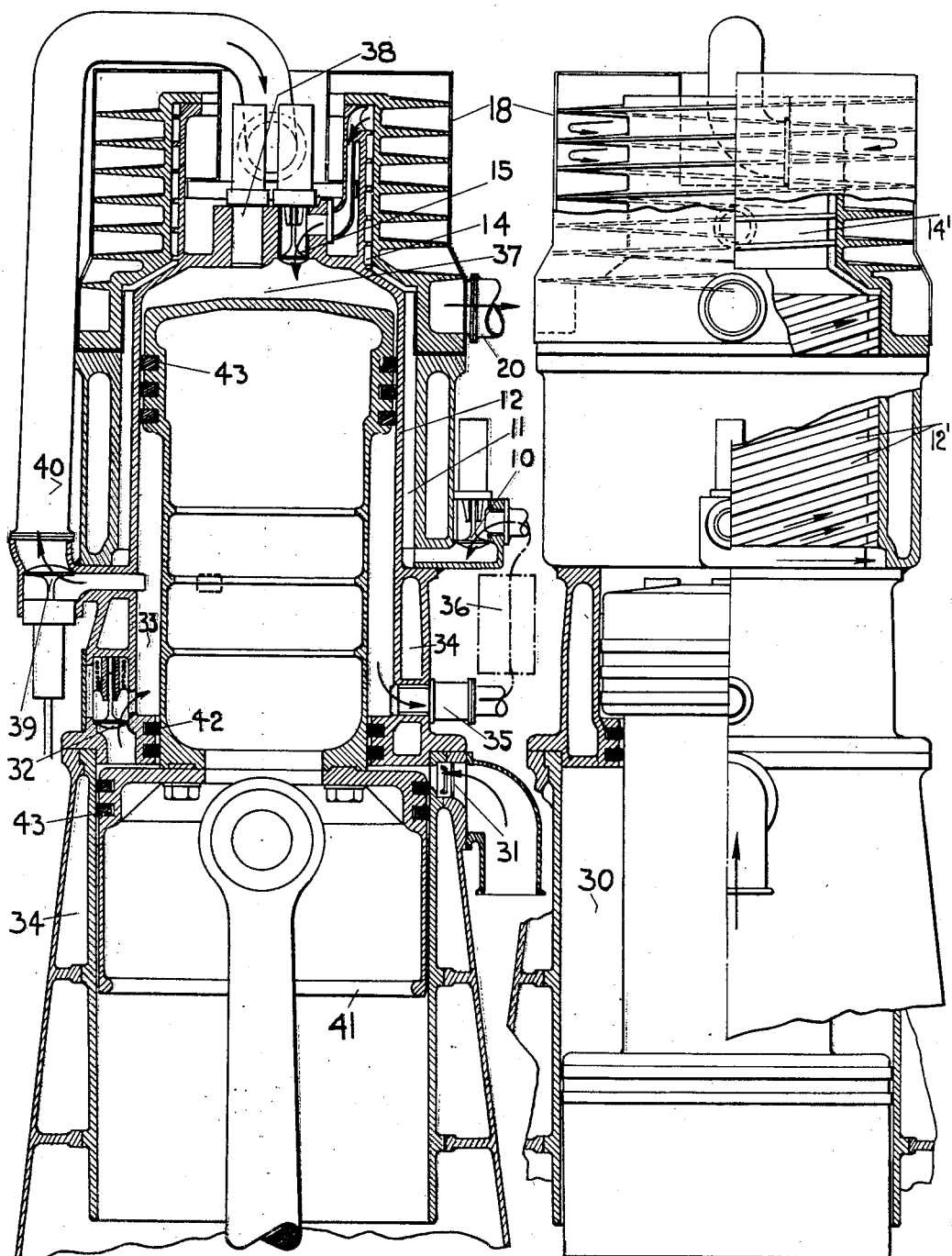

Sept. 4, 1934.                M. HENTER                1,972,589
                       INTERNAL COMBUSTION ENGINE
                    Filed Feb. 11, 1929      6 Sheets-Sheet 5
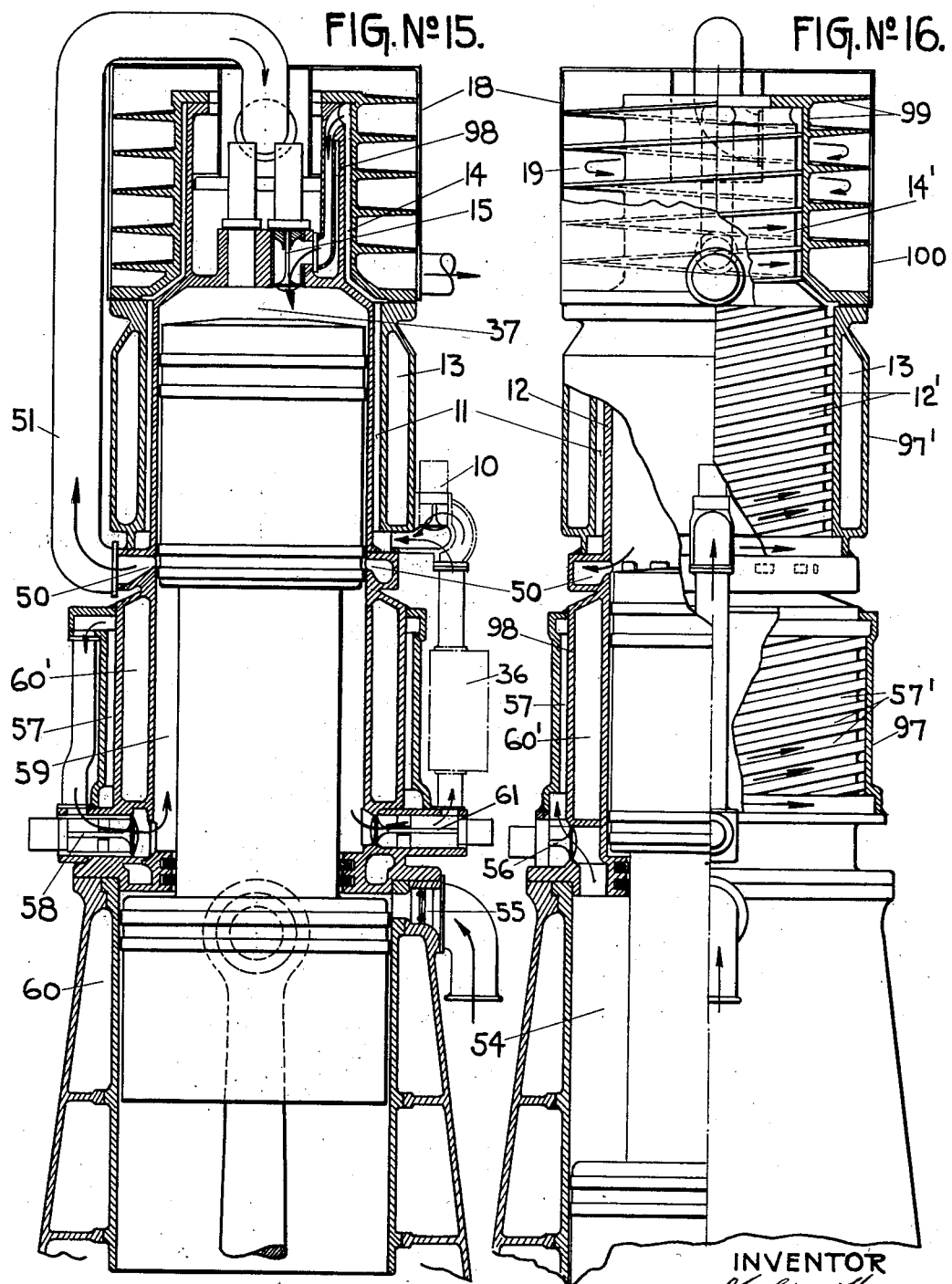

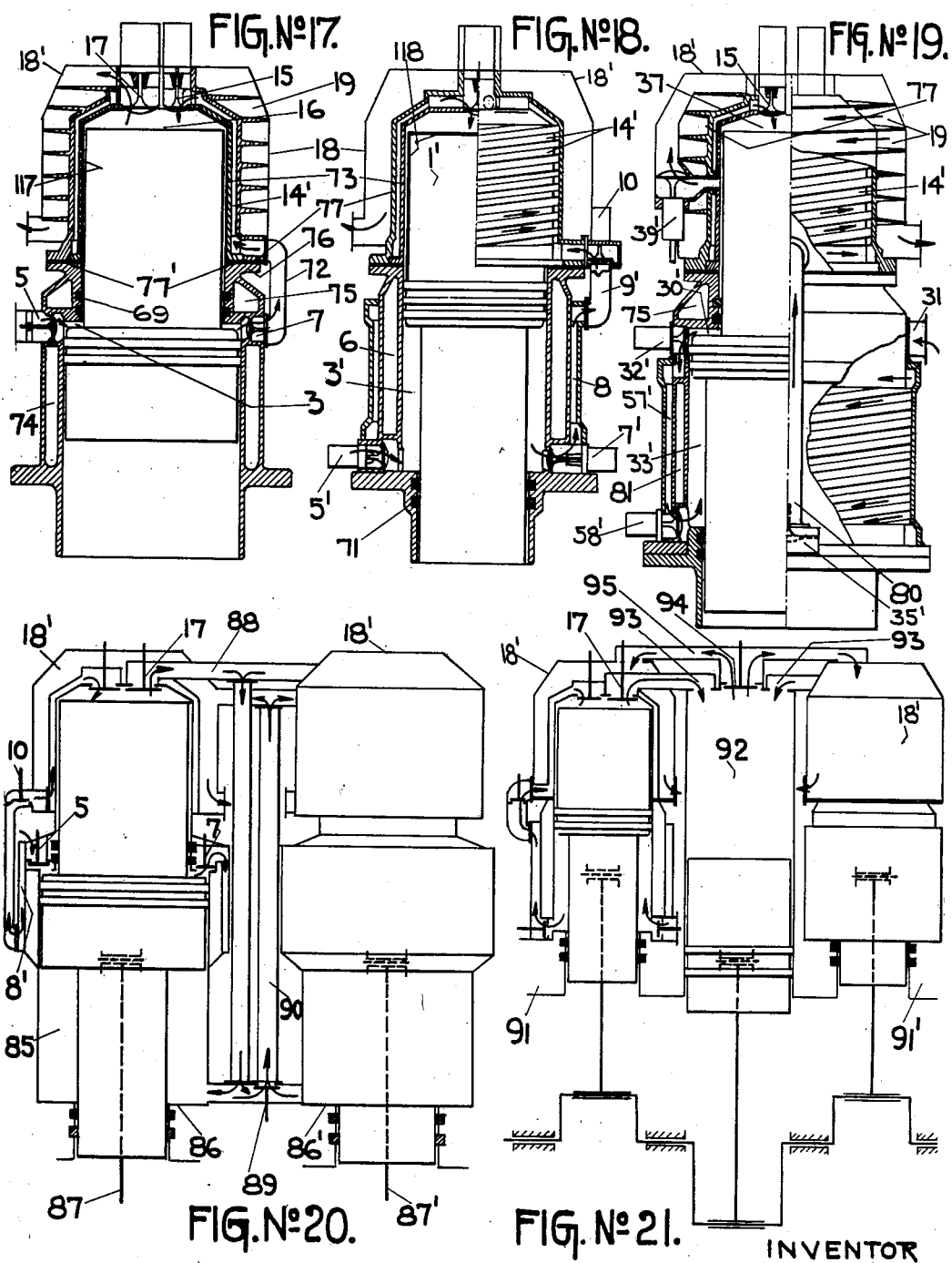

Patented Sept. 4, 1934

1,972,589

UNITED STATES PATENT OFFICE 1,972,589

INTERNAL COMBUSTION ENGINE

Mathias Henter, Milwaukee, Wis.

Application February 11, 1929, Serial No. 339,228

10 Claims. (Cl. 123—27)

This invention relates to internal combustion engines with slow burning combustion.

In the known slow burning internal combustion engines the combustion temperature, that is the temperature at which the combustion has to take place, is created by adiabatically compressing atmospheric air with mechanical means. Thus a compression of 35 to 40 at. is necessary. The cylinder is cooled by external means and the part of the heat carried away by this cooling process is a direct loss for the system. The exhaust gases have a high temperature, thus effecting a heat loss.

On account of the high pressure necessary for the present system the mechanical structure of the engine is very heavy.

Further speed regulation is limited while at a lower speed the combustion temperature is not reached as heat losses occur during compression. Further, the fuel injection time is relatively short therefore high speed is limited.

Further, the cylinder is strongly cooled by external means, as the temperature of the cylinder wall has to be low on account of the lubrication for the sliding piston.

This invention overcomes the defects stated above. The primary object of this invention is to provide an internal slow burning combustion engine in which the high pressure and temperature or only the temperature of the air supplied for combustion is not secured solely by mechanical means but in which the high pressure and temperature or only the high temperature is secured by external heating of mechanically compressed air thereby raising its pressure and temperature or only its temperature by transferring a large part of the heat of the exhaust gases to the compressed air. For raising the pressure by heating, the air has to be trapped after leaving the compressor.

This mode of operation not only saves a large part of the heat of the exhaust gases but also relieves the mechanism of the work of compressing the air to a high pressure, both means improving the efficiency.

Further objects are to provide a combustion engine in which the combustion cylinders are cooled by compressed air supplied for the combustion. Thus this cooling process is not a direct heat loss as in known forms of engines. The temperature of the material of the combustion cylinder is kept high effecting that less heat is transferred by the cooling process and that the efficiency is improved materially.

Further, a higher combustion temperature is secured with a lower compression by mechanical means, thus improving the combustion of the injected fuel. In the mode of operation with a plunger piston in the combustion cylinder the lubrication of the engine can be obtained in a better way, higher mechanical efficiency results, a higher temperature of the cylinder walls is allowed as the plunger piston does not slide on the cylinder wall.

Further objects are to provide a combustion engine in which the air is isothermally compressed and hereby the mechanical power required for this compression is reduced, and the engine is released of a material part of the mechanical load, in which this isothermally compressed air cools the combustion cylinder and is heated by the exhaust gases, so the pressure and temperature rise without throwing further mechanical load upon the engine.

Further objects are to provide a combustion engine in which the temperature in the combustion room is such that crude fuel and pulverized coal may be sprayed or burnt in the combustion cylinder, which combustion temperature secured with a lower mechanical compression of air by means of heating compressed air externally with the exhaust heat and the dissipating heat of the combustion cylinder, which heating is done before fuel is injected.

Generally the invention improves the efficiency of the internal combustion engines and provides a practically very reliable engine.

Embodiments of the invention are shown in the accompanying drawings in which:

Figure 1 shows pressure-volume curves with internal heating at constant pressure;

Figure 2 shows corresponding curves as Figure 1 with external heating at a condition between constant pressure and constant volume;

Figures 3 and 4 show the pressure-volume curves of two cycle processes at 30 at. pressure;

Figure 5 shows the pressure-volume curves at 25 at. pressure of a 4 cycle process;

Figure 6 shows the pressure-volume curves at 25 at. pressure of a 2 cycle process;

Figures 7 and 8 show a series of temperature-entropy diagrams;

Figures 9 and 10 show the pressure-volume diagram at 25 at. of a 2 cycle process;

Figure 11 is a sectional view of a 4 cycle engine;

Figure 12 is a corresponding elevation taken at a right angle to Figure 11 with parts in sectional view and parts broken away;

Figure 13 is a sectional view of a 2 cycle engine;

Figure 14 is a corresponding elevation taken at a right angle to Figure 13 with parts in sectional view and parts broken away;

Figure 15 is a sectional view of a 2 cycle engine;

Figure 16 is a corresponding elevation taken at a right angle to Figure 15 with parts broken away and parts in section;

Figure 17 is a sectional view of a 4 cycle engine;

Figure 18 is a sectional view of a 4 cycle engine with parts in elevation;

Figure 19 shows a 2-cycle engine; the left half is shown in sectional view, and the right half in elevation, with parts broken away;

Figure 20 is a diagrammatic view, showing the left hand cylinder in sectional view and the right hand cylinder in elevation;

Figure 21 is a diagrammatic view showing the middle and left hand cylinder in sectional view, and the right hand cylinder in elevation;

Figure 22 is a sectional view of a combustion cylinder with the heated air inlet valve at the cylinder lowermost end;

In the diagrams chosen for illustrating the pressures and temperatures throughout this disclosure are given in absolute value, pressure in atmospheres, temperatures in centigrades. Computation is made upon the value of:

$$\frac{\text{Specific heat at constant pressure}}{\text{Specific heat at constant volume}} = 1.41$$

For corresponding and identical points of the illustrated curves the same letters are employed.

Referring to Figure 1, it will be seen that air of the volume AB is isothermally compressed along BC to the volume GC, externally heated at constant pressure (by means of otherwise wasted exhaust heat) from C to F, internally heated by combustion at constant pressure from F to D, adiabatically expanded from D to E, exhaust takes place from E to B. Dash-dot-curve BF represents the adiabatic compression of the Diesel process. It will be seen that the area enclosed by figure BCFB is additional useful work to the Diesel process represented by the area BFDEB.

Referring to Figure 2, it will be noticed that the difference between Figures 2 and 1 is as follows: isothermal compression of air volume AB takes place along BC' to the volume HC', external heating by means of the regenerated heat to the volume at GF; this external heating takes place at a condition between constant pressure and constant volume; C'K would show heating at constant pressure, KF heating at constant volume. C'F is a straight line to indicate that the air condition is changed from the condition C' to that one at F.

The additional gained useful work is shown by the area BC'FB. The work of compression is shown by the area underlaying the curve BC' above the atmospheric line, and for the Diesel process the work of compressing is shown by the area underlaying the curve BF. It will be seen that less work is done by mechanical compression than in the Diesel process and on account of this less negative work the mechanical efficiency will be improved. The just described process in Figures 1 and 2 give the fundamental theory for the engines hereafter described.

Figure 3 represents the compression of fresh air by mechanical means with the following external heating by regenerated heat, and Figure 4 shows the pressure-volume diagram of the combustion cylinder. Figures 3 and 4 belong together for a complete process, but two different processes are shown.

The mode of operation for the first process is as follows: Intake of fresh air along AB, isothermal compression of this air volume along BC, external heating from C to F at constant pressure by means of the regenerated heat. In Figure 4 gas of high temperature of the volume A'M is compressed adibatically along MN to the volume G'N. From N to T the heated air of the volume GF in Figure 3 is forced into the combustion cylinder and at the same time combustion at constant pressure occurs. From T to X adiabatic expansion takes place and exhaust along XB'M.

The mode of operation for the second process is as follows: In Figure 3 intake of fresh air along AB, isothermal compression along BC' to the volume HC', external heating at a condition between constant pressure and constant volume from C' to the air condition at F. C'K would show heating at constant pressure and KF heating at constant volume. Line C'F shall only indicate that the air condition changes from the condition at C' to that at F. It is shown that the air is compressed by mechanical means only to the pressure at C' and the pressure and temperature is raised by external heating to the necessary combustion pressure at F (without throwing further work on the mechanism for mechanical compression) therefore the air of high temperature flows into the combustion room in Figure 4, when the air volume G'N of high temperature—compressed adiabatically by mechanical means from volume A'M to volume G'N—will expand. Fuel spraying is to be started at N and the fuel ignites readily as the gas volume G'N has a very high temperature. Combustion occurs along NT' and further expansion from T' to X, exhaust takes place along XB'M.

Figure 6 is a modification of Figure 4. Point M of Figure 4 has moved to point B' of Figure 6.

The area enclosed by the curves B'F and DE represents the Diesel cycle for the same fuel supplied for combustion.

The just described processes of Figures 3 and 4 as well as the processes of Figures 3 and 6 are adopted for two cycle internal combustion engines.

The mode of operation of the cycle shown in Figure 5 is as follows:

The fresh air volume AB is compressed isothermally by mechanical means along BC' to the volume HC', externally heated by regenerated heat from condition C' to condition P, expanded from P to R during which expansion the air is further heated by regenerated heat, adiabatically compressed by mechanical means from R to S, heated by internal combustion from S to T, adiabatically expanded from T to X, and exhausted from X to B.

The area BFDEB represents the positive work in the Diesel process for the same number of heat units supplied for internal combustion at the same pressure.

In Figure 9, a modification of Figure 5 is shown. The difference of Figure 9 and Figure 5 is as follows:

The gases are expanded from T to X as in Figure 5 and further expanded from X to X'. Thus the final expansion volume at X' is larger than the initial volume AB of the air taken in. Exhaust takes place from X, B' to B. It is to be said that more heat units are supplied during the combustion as shown in Figure 5. The positive work is given by the area BC' PRSTXX'B'B.

Figure 10 is similar to Figure 9 with the following modification: Adiabatic compression by mechanical means takes place from B to N, instead of isothermal compression as in Figure 9, external heating by means of regenerated heat from N to P, adibatic expansion from P to R, and the cycle is completed as in Figure 9, but less fuel is supplied.

In the pressure volume diagrams just described, it is to be noticed that the fresh air is compressed preferably isothermally, but this compression may take place at any condition between isothermal and adiabatic as well as adiabatic compression. The best efficiency is obtained with isothermal compression.

In the following the temperature—entropy diagrams of Figures 7 and 8 will be described. In this diagram the small letters correspond to similar points marked with capital letters in the pressure-volume diagrams, also it is to be noted that the curves are drawn for ideal air processes.

WV represents curves of constant volume, WP curves of constant pressure and are drawn upon the value of the co-efficient of heating at constant volume $$CV = .169$$

and upon the value of the co-efficient at constant pressure $$c_p = .238.$$

Referring to Figure 7, air cycle $bc''fdeb$ represents: $bc''$ isothermal compression, $C''f$ heating by the exhaust gases at constant volume, $fd$ heating by fuel at constant pressure, $de$ adiabatic expansion, $eb$ heat rejection at constant volume. It is to be seen that in this ideal air cycle all exhaust heat represented by the area underlaying the curve $eb$ is utilized for heating the isothermal compressed air so that area underlaying $c''f$ equals area underlaying curve $eb$. Thus the thermal efficiency of this cycle equals area $bc''fdeb$ divided by the area $vfdyv$, while the efficiency of a similar Diesel cycle for the same fuel heat units equals area $bfdeb$ divided by area $vfdyv$.

Air cycle $bcfd'e'b$ represents: $bc$ isothermal compression, $cf$ heating by the exhaust gases at constant pressure, $fd'$ heating by fuel at constant pressure (combustion), $d'e'$ adiabatic expansion, $e'b$ heat rejection at constant volume (exhaust); again all exhaust heat represented by the area underlaying the curve $e'b$ is utilized for heating the isothermally compressed air so that area underlaying the curve $cf$ equals the area underlaying the curve $e'b$.

Thus the thermal efficiency of this cycle equals area $bcfd'e'b$ divided by the area $vfd'y'v$.

Heating of isothermally compressed air at a condition between constant pressure and constant volume may occur along a curve laying between the constant pressure curve $cf$ and the constant volume curve $c''f$, but actual air compression and the following heating may take place along the shown dash-dot line $bf$.

Referring to Figure 8, air cycle $bc'prstx'b'b$ is identical to the pressure volume diagram Figure 9, and it is to be said that the exhaust line X'B'B of Figure 9 is replaced by a curve $x'b'b$ of Figure 8. That means heat rejection takes place at constant pressure from $b'$ to $b$, and at constant volume from $x'$ to $b'$. Further, it is to be stated that only a part of the exhaust heat underlaying the curve $x'b'b$ is regenerated, represented by the area underlaying the curve $c'pr$, thus the efficiency obtained by this cycle equals area $bc'prstx'b'b$ divided by the area $ustzu$.

The efficiency of a Diesel cycle with compression to 40 at. and the same number of supplied heat units is given by the ratio of the area $bfdeb$ to the area $vfdy''v$, but it is to be noticed that although the Diesel cycle has a maximum pressure of 40 at. instead of 25 at. of this cycle just described.

The efficiency of said Diesel process is lower than the efficiency of the cycle here with 25 at. maximum pressure.

Further, it is essential that less difficulties in construction and operating the 25 at. engine are prevailing as with the 40 at. Diesel. In the Diesel all exhaust heat is rejected at constant volume along the curve $eb$.

The temperature entropy diagrams show distinctly that with the new described engine with heating of compressed air by regenerated heat and with a lower highest pressure than in the Diesel process with at least the same combustion temperature, the fuel heat is supplied at a higher entropy. On account of the resulting large final expansion volume at atmospheric pressure, it is necessary that the final expansion volume is larger than the initial compression volume at $b$ in order to maintain the highest possible thermal efficiency.

The process with the same initial compression and expansion volume is shown in Figure 9 by the exhaust line XB, and respectively in Figure 8 by the constant volume curve XB, thus is clearly shown that the area $bxx'b'b$ indicates a considerable gain of work by further expanding from $x$ to $x'$.

In Figure 7, processes similar to the just described processes of Figure 8 are shown. Cycle $bnp (r) stx'b'b$ is corresponding to the pressure volume diagram of Figure 10. The mode of operation of this cycle is as follows: Adiabatic compression from $b$ to $n$, external heating of the compressed air by means of regenerated heat form $n$ to $p$ and hereafter either adiabatic expansion from $p$ to $r$ with following adiabatic compression from $r$ to $s$, or direct compression from $p$ to $s$. The cycle is completed as described in Figure 8.

It is possible to obtain a perfect constant pressure heat rejection by realizing an expansion to the terminal pressure as for instance shown by line $d''b'$, so heat is rejected in the exhaust along the constant pressure curve $b'b$, although it is not advisable for a piston engine considering the mechanical efficiency on account of relatively too large a cylinder volume.

The engine shown in Figures 11 and 12 comprises a combustion cylinder and an associated air compressor with one differential piston provided with the combustion cylinder piston 1 and the fresh air compressor piston 2, so that with one moving trunk piston all work is done. The annulus between two diameters is utilized as compressor cylinder at 3. The piston 1 is relieved over the greater portion of its length and merely acts as a carrier for the rings 4. This results in a saving of lubricating oil.

Fresh atmospheric air is taken in through valve 5 into the compressor stage at 3 driving the downward stroke of piston 1—2. During the upward stroke, valve 5 is closed, and compression of the air takes place, water cooling is provided at 6. On account of the differential piston a large cooling surface is provided and therewith a more ideal isothermal compression of the air is obtainable. Compressed air passes through the non-return valve 7 into the annular intercooler 8, which is hereinafter to be described.

From the intercooler 8 the compressed air passes through the communication 9 and self-controlled valve 10 in the annular combustion cylinder cooler 11, where the compressed air extracts heat from the combustion cylinder 12, therewith the temperature and pressure of the air increase, and by this mode of operation it appears that the heat transferred from the combustion cylinder 12 to the air is not a direct heat loss. Further water cooling is provided at 13, if necessary, and it is advised that only the most necessary heat is transferred to the water, or this water cooling process is totally avoided as it appears hereinafter in a different mode of operation. From the cylinder cooler 11 the air flows into the heater 14, in which heat is transferred from the exhaust gases to the compressed air in a manner hereinafter described to appear.

The heated air flows from the heater 14 through communication 15' and through the valve 15 into the combustion room 16. The exhaust gases flow through the outlet valve 17 into the regenerator 18, forming a spiral passageway 19 receiving the exhaust gases. It is to be noted particularly that the flow of hot exhaust gases is spirally around the regenerator, and from the uppermost end downward, and the air supplied for combustion flows through the spiral passageway 14' upwards, in a manner that perfect counter flow is secured so that the most possible heat from these hot gases is imparted to the walls of the passageway 14' into which the compressed air is led, as described.

In the mode of operation, a counter directional flow of the compressed air and the products of combustion is secured by this construction and a maximum interchange of heat is therefore affected. The exhaust gases leave the regenerator at 20.

The form of engine described in Figures 11 and 12 is preferably adapted to the pressure volume diagram Figure 5. In this mode of operation, the air compressor furnishes in 2 cycle operation successively half the volume of compressed air for the combustion, which takes place successively in 4 cycle operation. Further, it is to be noticed that valve 10 is a non-return valve, self-controlled, whereby said valve will close automatically at a state of equilibrium and prevent increasing pressure in the regenerator from being transmitted to the means for compressing the air, by this mode of operation the compressed air is trapped and pressure and temperature are allowed to raise without throwing any further load upon the air compressor.

It is further to be noticed that the regenerator member 21 is insulated from the annular member 22 by means of an annular heat insulation plate 23, so that no heat flows from the regenerator into the member 22.

In Figure 5, the air volume AB is compressed in two compressing operations to the volume at C' in the compressor 3, heating takes place in the cylinder cooler 11 and regenerator 18 to the condition at P. The valve 15 opens and the air volume of condition P flows into the cylinder 16, with downward moving piston, so at the end of this cycle the air condition at R is reached, driving the second stroke the upward moving piston compressed the air from R to S. At S combustion takes place and at the end of the third cycle, the gas condition at X is reached. Exhaust from X to B and with the upward moving piston in the fourth cycle through the valve 17. Valve 15 is opened, during the first cycle, this valve also valve 17 is operated and governed in the regular way with cam and gear, but this is not shown.

With the mode of operation, as shown in Figure 5, the heat rejection in the exhaust takes place at constant volume, that is the initial air volume at B is the same as the end volume of the combustion gases at X, but as well the mode of operation with heat rejection partly at constant volume and partly at constant pressure may be adopted as it will appear hereinafter to be described.

In the following, referring to Figures 13 and 14 a two-cycle engine is described.

Air is taken into the annular compressor 30 through the non-return valve 31 and compressed through the non-return valve 32 in the annular second compressor stage 33, while the compressor is cooled at 34. In the second compressor stage 33, the air is compressed through the non-return valve 35 into the cooler 36 and through valve 10 into the cylinder cooler 11. Air cooler 36 and valve 10 may be omitted, air cooler is shown schematically. From the cylinder cooler 11 the air flows into the regenerator passageway 14, where heating by the regenerated heat takes place, and hereafter the heated air is admitted through valve 15 to the combustion room 37. The fuel injection valve is shown at 38. The exhaust gases flow through valve 39 into the regenerator 18 by means of the communication 40, and leave the regenerator at 20, as previously described. The exhaust valve 39 may be placed at any point on the side of the combustion cylinder, while location is determined by the p. v. diagram and as designed. Figure 4 shows that at point M the exhaust valve has to be closed and therewith the location on the side of the cylinder is determined by the predetermined p. v. diagram. The piston 41 is a differential piston and forming the first compressor stage at 30 and the second at 33, and with piston rings at 43. Inward springing rings are provided at 42. Other features are the same as described for Figures 11 and 12.

For the mode of operation, it is referred to the p. v. diagram 3 and 4. The air volume AB in Figure 3 is compressed successively in compressor stage 30 and thereafter in stage 33 in 2 cycle operation to the prescribed pressure. Cooled compressed air is admitted to the cylinder cooler 11 and thereafter to the regenerator passageway 14 and is heated to the volume GF. If the piston 41 is at the upper position, as shown in Figure 13, the valve 15 is opened and the heated air of the volume GF is forced into the combustion room 37, in which the recompressed air volume G'N has a very high temperature, fuel is injected through the fuel valve 38 and combustion takes place in a prescribed manner. During the downward stroke the outlet valve is kept closed and during the upward stroke the valve 15 is closed. Outlet valve is open along B'M. At M, the outlet valve closes in order to recompress the volume MA' to the volume G'N. This volume MA' is unburned air of a high temperature, which air is admitted into the combustion cylinder 37 from the regenerator by the valve 15 during the downward stroke, after the combustion ceases. At M this air has still a high temperature and is adibatically recompressed along MN and at N combustion, of the injected fuel starts readily and continues along NT while heated fresh air is supplied through valve 15.

The form of the engine shown in Figures 15 and 16 is similar to the described form of Figures 13 and 14, and further referring to Figure 6.

The described point M in Figure 4 has moved to point B' in Figure 6, that is, the outlet of the exhaust gases is located at the end of the piston stroke and in this case no outlet valve is necessary, but slots are used as shown at 50, and the exhaust gases flow through these slots and by means of the communication 51 into the regenerator 18. The air volume B'A' of a high temperature is adiabatically recompressed to the volume G'F by means of the upward moving piston. At F the heated air volume supplied for combustion flows from the regenerator through valve 15 into the combustion room 37 and combustion takes place along FT" partly with decreasing pressure and with downward moving piston. The exhaust takes place from X to B', that is at the piston lowest position through the slots 50, the remaining volume A'B' is unburned air of high temperature, which air flows during the downward stroke from the regenerator 18 through valve 15 into the combustion cylinder, with decreasing pressure, after the combustion ceases. The heated fresh air volume supplied for combustion from the regenerator 18 through valve 15 has either the same pressure as the volume G'F or a higher pressure and is admitted at F into the combustion cylinder and flows into the combustion cylinder in accordance to the pressure relation in the regenerator and in the combustion cylinder.

Atmospheric air is taken into the first compressor stage 54 through the non-return valve 55, and compressed through the non-return valve 56 into the intercooler 57 and through the non-return valve 58 into the second compressor stage 59. In compressor 59 the air is further compressed through the non-return valve 61 into the cooler 36, thereafter the air is admitted through valve 10 into the cylinder cooler 11 and regenerator passageway 14 and flows into the combustion cylinder through valve 15 as described. The cooler 36 is shown schematically and this cooler and valve 10 may be omitted as described for Figures 13 and 14. The form of engine in Figures 15 and 16 is water cooled at 60 and 60' to obtain a better isotheral compression, and further water cooling is provided at 13 in a manner described at Figures 11 and 12. The heat transferred to the water at 13 has to be as little as possible, as previously described.

In the following, the novel feature of employing a plunger piston in the combustion cylinder is described, and it is to be noticed that the combustion cylinder is not cooled by an external cooling medium as compressed air supplied for combustion, cools the combustion cylinder, the temperature of the combustion cylinder walls is kept higher, as the plunger piston does not slide on the cylinder walls.

Referring to Figure 17, it is well noticed that a very simple form of engine is given for the mode of operation of such processes herein described.

In such an engine, the air compressor stage 3 furnishes the compressed air in 2 cycle operation, whereas the combustion in cylinder 16 occurs successively in 4 cycles. This form of engine is similar to the form in Figures 11 and 12, with exceptions herein to appear. Air is taken into the compressor cylinder 3 through the inlet valve 5 and compressed through the non-return valve 7 into the passageways 14' of regenerator 18' by means of the communication 72. By means of this compressed air the cylinder walls 73 are cooled and also heat is taken in by the compressed air from the exhaust gases flowing in the spiral passageways 19. The heated compressed air flows through valve 15 into the combustion room 16 as admitted by valve 15. Exhaust gases flow through valve 17 into the passageways 19 of the regenerator 18'. Water cooling is provided at 74 and 75, such cooling medium may be as well atmospheric air, but it is essential that the combustion cylinder is not cooled by an external medium, but is cooled by compressed air and this cooling is not assisted by water cooling as previously described in Figures 11 and 12. The temperature of the combustion cylinder is kept higher as the cylinder walls are not lubricated on account of the plunger piston. Inwardly springing springs are provided at 69 in the member 76. Heat insulation is provided at 77', so no heat flows from combustion cylinder 73 and regenerator member 77 into the water cooled member 76.

The engine of Figure 18 is similar to the just described engine of Figure 17 with the following exceptions:

The compressor stage is formed at 3' with inlet valve 5' and outlet valve 7'. The air is compressed through valve 7' into the intercooler 8 and admitted through communication 9' and valve 10 into the regenerator passageway 14' and the operation is completed as described for Figure 17 and Figures 11 and 12. It is to be noted, that the combustion cylinder 73 is not lubricated, as the plunger 1' does not slide on the cylinder 73, lubricated is the well cooled compressor cylinder 3', which results in a material saving of lubricating oil.

Further, it is essential that the compression of air in the cylinder 3' takes place during the downward stroke, so that a thrust cushion is created for the downward moving piston, which results in a better mechanical efficiency and in a lighter connecting rod and associated parts.

The engine of Figure 19 is similar in operation to the described engine of Figures 13 and 14, with 2 cycle operation. The first compressor stage is utilized at 30' with inlet 31, the air is compressed through valve 32' into the intercooler 57' and through valve 58' into the second compressor stage 33'. Where the air is further compressed through a non-return valve 35' into the regenerator passageways 14' by means of the communication 80, where heat is regenerated from the cylinder walls and from the exhaust gases, and the cycle of operation is completed as described for Figures 13 and 14.

Water cooling is provided at 75 and 81, which water cooling may be replaced by atmospheric air, and cooling with atmospheric air may be added on the outside of intercooler 57'.

In the following and referring to Figures 20 and 21, the mode of operation of the p. v. diagrams of Figures 9 and 10 respectively, is realized and described. For expansion of the combustion gases from X to X' an additional expansion cylinder or cylinders are provided which mode of operation occurs in 2 cycles. The construction of these expansion cylinders is light, as the highest pressure prevailing in these cylinders is the pressure of the combustion gases at X. Two complete indentical combustion cylinders with associated compressors are combined to one process and referring to Figure 20 it will be seen that this additional expansion cylinder is provided at 85, as well for unit 86 as for unit 86', thus an equalizing of pressures acting upon the connecting rods 87 and 87', and associated members is secured.

The combustion cylinder with compressor is identical to Figure 17 with an additional air cooler at 8' and non-return valve 10. The operation of the combustion cylinder with air compressor is the same as described for Figure 17, that is the compressor furnishes in 2 cycle operation the air supplied for combustion, and for each 2 cycles half the volume, whereas the combustion occurs in 4 cycles successively.

The expansion XX' takes place in the expansion cylinder 85 of unit 86 and of 86'. The combustion gases of the volume and pressure at $x$ flow through valve 17 and communication 88 into the expansion cylinder of unit 86 and unit 86' where expansion takes place with upward moving pistons, during the downward stroke the exhaust valve admits the exhaust gases through valve 89, and communication 90 into the regenerators 18' which expansion process takes place for the unit 87 and unit 87' successively with an angle of operation of 360°, but each combustion cylinder discharges in the same time into two expansion cylinders, that is, every second cycle one combustion cylinder discharges into both expansion cylinders.

In the arrangement of Figure 21, the same effect is accomplished as just described for Figure 20, but one additional expansion cylinder 92 is provided for two identical units 91 and 91'. Units 91 and 91' are identical in operation and construction to engine of Figure 18, previously described. The combustion cylinder of unit 91 discharges at X through valve 17 and communication 93 into the expansion cylinder 92, with an angle of operation of 180°, the exhaust gases flow from the expansion cylinder 92 through the outlet valve 94 and communication 95 into both regenerators 18 of unit 91 and of unit 91', and it is essential that combustion and discharging of the combustion gases into cylinder 92 occurs in 4 cycle operation for each unit.

The cycle of both units is displaced at an angle of 360°. The form of engine of Figure 21 represents a well-balanced unit, whereas the p. v. diagram of Figure 9 or 10 is well realized.

In the following the intercooler and regenerators are described in detail. For such an intercooler it is referred to Figure 16, an annular water space is provided at 60'. A number of spiral passageways is provided in the outermost wall of the water space 60' as most clearly shown at 57', in order to increase the contact surface for the air, as the air flows through such spiral passageways.

The annular member 97 is fitted upon the passageways 57' and is preferably welded to the member 98. It is to be noticed that such passageways for air are only shown through this disclosure, where the member 97 is cut away and the passageways appear in view. In the left hand section of the Figure 16, the cut through these spiral passageways is omitted to prevent confusion, and the cooler is shown at 57, as it appears with the cooling space 57.

In the cylinder cooler 11, spiral passageways 12' appear in the same manner and are provided in the cylinder 12 and it is seen, that in the annular member 97', which is fitted to the passageways 12' as shown, is provided an annular cooling space 13 for water in the case, air cooling alone is not sufficient.

In the regenerator 18 the spiral passageways for air are provided in member 98, and the outmost annular member 99 is provided with the spiral passageways 19 for the combustion gases and is fitted to the passageways 14' as shown. The spiral passageways 19 are covered with the member 100 as it appears. The passageways 14 in Figure 15 correspond to the passageways 14' in Figure 16.

In the regenerator as it appears in Figures 17—18—19—20—21, the passageways 14' for compressed air are provided in the cylinder 73, as it is shown most clearly in Figure 18. The outer annular member 77 is provided with the spiral passageways 19 for the exhaust gases as it appears most clearly in Figure 19. In this construction of regenerator 18', no water cooling is provided for the combustion cylinder 73, except if necessary for cooling purpose of the inlet and outlet valve 15—17—39.

In the diagrams, Figures 3, 4, 5, and 6, the final expansion volume at $x$ is the same as the initial volume of fresh air at B. This means that the volume of the combustion cylinder is the same as the first pressure stage compressor. These diagrams may be modified as explained in Figures 9 and 10, so that the gas volume at $x$ is further expanded and the energy of the expanding gas is utilized for development of power. There are two possible ways to do so. The first one—the volume of the combustion cylinder is larger than the initial air volume AB, so that the compressor compresses the volume AB and the combustion cylinder volume is so designed as to allow an expansion further than to the point X.

The second way to expand the gases further than $x$, is reached by employing an expansion cylinder as described in Figure 21, so that the heat in the exhaust gases is rejected partly at constant volume and partly at constant pressure as described in Figures 9 and 10 respectively.

The mode of operation of the engine of Figure 22 is the same as described for Figures 17 and 18, the inlet of heated air differs from the construction of Figures 17 and 18. The compressed air flows into the regenerator 14' at 122, the heated air is admitted through communication 119, valve 15 and slots 120 into the combustion cylinder 16.

By doing so, the air flows from slots 120 upward through the passageway 121 into the combustion cylinder 15, thereby blowing upward all accumulating matter and the expanding air cools in the same time piston and cylinder. This mode of operation is rather advised with burning pulverized coal as fuel.

In the following, another novel feature is to be described. As previously said, the plunger piston does not slide on the combustion cylinder walls, for this reason the combustion cylinder is lined with a heat insulating or refractory material, to prevent the heat flow, or to reduce the heat flow from the hot combustion gases to the combustion cylinder wall, as shown in Figure 17 at 117 and for the same reason the plunger piston of Figure 18 may be insulated as shown at 118, and as well as plunger piston and combustion cylinder are insulated as shown in Figure 22 at 117 and 118.

Further it has to be understood that the chambers provided for water cooling may be modified and used for air cooling, such cooling air is taken from the atmosphere and delivered into the atmosphere after passing the cooling spaces.

With this mode of operation an internal slow burning engine is given for automobile locomotive power or otherwise with partly cooling with air as an internal cooling medium as the air is compressed, cools the combustion cylinder and is supplied for combustion and partly cooling with air as an external cooling medium, and further such an engine has no water radiator, no spark plugs, no carburetor, has an efficiency much better than the present time gasoline engine, and uses any crude oil for combustion and in addition the combustion cylinder piston is not lubricated, therewith saving lubricating oil.

It is apparent that these engines herein described in considerable detail may work at the same pressure as the Diesel engines, in such a high pressure engine, the efficiency is still further improved, as the engine with the higher combustion pressure has the better efficiency under the same circumstances. The most novel feature of this engine is to produce an internal combustion engine with a better efficiency than any other known prime mover known at the present time. On account of this novel process, herein described, even at a low pressure the necessary combustion temperature for injected oil is secured, and with a high combustion pressure which, in turn, secures a very high combustion temperature, pulverized coal may be injected and such engine successfully operated at a very low cost of fuel, never before reached.

The low pressure engine is started by heating the regenerator externally or by means of the fuel valve described in the application for oil and gas turbines. The high pressure engine is readily started with injected fuel.

Although the invention has been described in considerable detail, such description is intended as illustrative rather than limiting, as the invention may be variously embodied and as the scope of such invention is to be determined as claimed.

I claim:

1. An internal slow burning combustion engine comprising an air compressor for compressing atmospheric air, passageways provided around the compressor cylinder, means for conducting atmospheric air through said passageways to thereby cool the air compressor, a combustion cylinder for receiving compressed air from said air compressor, passageways provided around said combustion cylinder, means to conduct compressed air from said air compressor through said air passageways to thereby cool the combustion cylinder and to heat the air externally, means for burning fuel in said heated air in the combustion cylinder, a piston to convert a portion of the energy of the combustion results into mechanical energy and to compress the air in said air compressor, said combustion engine being air cooled substantially as described.

2. An internal slow burning combustion engine comprising: an air compressor having a compressing cylinder to compress atmospheric air, an air receiver to receive the compressed air from the air compressor, a combustion cylinder combined with said air compressor cylinder to burn fuel at a slow burning condition in air received from said air receiver, a differential piston operatively fitted to said air compressor and said combustion cylinder, a fuel injection valve, an air inlet valve fitted to the combustion cylinder in the connection to said receiver, an exhaust valve, said valves in the combustion cylinder being provided with means to operate in a manner that the combustion in said combustion cylinder takes place in a four-stroke cycle, whereas the compression of air in the said air compressor takes place in a two-stroke cycle, means to admit air from said receiver into the combustion cylinder at the end of the scavenging stroke, and means to develop power from the compressed air admitted from said receiver into the combustion cylinder during the filling stroke as well as from the combustion of fuel during the combustion stroke.

3. An internal slow burning combustion engine comprising: an air compressor to compress atmospheric air to a relative low pressure and provided with external cooling means, a receiver for the compressed air, an inlet valve to admit the compressed air and to trap the air in said receiver, means to heat the compressed air externally in said receiver by waste heat of the engine, this heat being heat extracted from the exhaust gases respectively heat dissipated or extracted from the combustion cylinder, a combustion cylinder to receive the compressed and externally heated air from said receiver, an inlet valve fitted to the combustion cylinder to admit periodically thereto said compressed and heated air from said receiver after the entire step of heating the air externally by means of said waste heat has taken place in said receiver, means to compress the said received and preparatorily compressed air mechanically in the combustion cylinder to a determined final pressure at which the injection of fuel commences, therewith securing a high temperature of the air to ignite the fuel at a relatively low pressure.

4. An internal slow burning combustion engine comprising: an air compressor to compress atmospheric air and provided with external cooling means to secure an air compression as close to the isothermal compression as it is mechanically possible, a receiver for the compressed air, an inlet valve to admit the compressed air and to trap the air in said receiver, means to heat the compressed air in said receiver externally by waste heat of the engine, a combustion cylinder to receive externally heated air from said receiver for combustion of fuel, an inlet valve fitted to said combustion cylinder and means to admit into the combustion cylinder through said valve at the commencement of the working stroke of the piston compressed and heated air after the entire step of heating the air externally by means of said waste heat has taken place in said receiver, a fuel injection valve and means to inject the fuel and to admit said heated air gradually and simultaneously during a part of the working stroke of the piston of the combustion cylinder.

5. An internal slow burning combustion engine comprising an air compressor, a regenerator receiving the compressed air, means for conducting the air in said regenerator in spiral passageways around the combustion cylinder to thereby cool the combustion cylinder, means for conducting the exhaust gases in spiral passageways around said air passageways thereby heating the compressed air externally, a non-return valve to admit air into the regenerator and to prevent the increasing pressure in said regenerator from being transmitted to said air compressing means, a combustion cylinder receiving the heated air, means for further increasing the temperature of the heated air to a high combustion temperature, means for spraying fuel in regular sequence for combustion, a piston to convert in regular sequence a portion of the energy of the expanding gases into mechanical energy, and compressing the air in said air compressor, and means for conducting exhaust gases through said spiral passageways in the regenerator.

6. An internal slow burning combustion engine comprising an air compressor, an intercooler, a regenerator, a combustion chamber provided with inlet and outlet valves, passageways provided around said combustion cylinder for conducting compressed air from said compressor through said passageways, thereby cooling the combustion cylinder and heating the compressed air externally, means for further externally heating the said compressed air by means of the exhaust gases, means to admit the heated air in regular sequence into the said combustion cylinder, means for further increasing the temperature of said heated air to a high combustion temperature, thereby expanding said air and heating the expanding air externally by regenerated heat and compressing said heated air adiabatically by said piston in said combustion cylinder to the combustion pressure, a fuel valve to inject fuel into said air of high temperature, thereby securing a complete combustion, a piston for converting a portion of the energy of the expanding combustion results and of the expanding air admitted from the regenerator into mechanical energy and for compressing the air in said compressor and for compressing said expanded heated air in the combustion cylinder, means for conducting the exhaust gases through the passageway in said regenerator.

7. An internal slow burning combustion engine comprising an air compressor, a regenerator for receiving the compressed air from said air compressor, means for conducting the compressed air in said regenerator in passageways arranged around the combustion cylinder to thereby cool the combustion cylinder, means for conducting the exhaust gases in passageways arranged around the air passageways in said regenerator to thereby heat the air externally, an inlet valve to admit compressed air into said regenerator, whereby said inlet valve closes at a state of equilibrium and prevents increasing pressure in the regenerator from being transmitted to said air compressor, a combustion cylinder provided with an inlet and outlet valve, said inlet valve to admit heated air periodically from said regenerator into the combustion cylinder, a fuel injection valve provided in said combustion cylinder to inject fuel into said periodically admitted air, said outlet valve of the combustion cylinder to pass the exhaust gases periodically through said passageways in the regenerator.

8. An internal slow burning combustion engine comprising a differential cylinder provided with one working cylinder in which combustion of fuel and expansion of the working gases takes place and provided with an air compressor consisting of two compressing stages connected in series, means for cooling said air compressor by an external medium, an intercooler for cooling the compressed air between compressing stages, means for conducting the air in said intercooler in spiral passageways around a cooling chamber provided around a compressor cylinder, a regenerator for receiving the compressed air from said air compressor, means for conducting the air in said regenerator in passageways provided around the combustion cylinder to thereby cool the combustion cylinder, means for conducting the exhaust gases in passageways provided around air passageways in said regenerator to thereby heat the air externally, a non-return valve in said regenerator to trap admitted air, an inet valve provided in said working cylinder to admit heated air from said regenerator, means for burning fuel in said working cylinder in the supplied heated air, a differential piston operatively fitted to said differential cylinder for converting a portion of the energy of the expanding gases in said working cylinder into mechanical energy and for compressing the air in said air compressor.

9. The process for converting the heat energy of fuel into work consisting in: compressing atmospheric air as close to the ideal isothermal compression as it is mechanically possible, trapping the compressed air, heating the trapped air externally in a heat regenerating system by waste heat, such heat being heat of the exhaust gases and heat dissipated or extracted from the combustion vessel, admitting for combustion a determined part of the heated air from said regenerating system into a combustion vessel fitted to develop power from the expanding gases therein, said vessel containing recompressed externally heated air with a temperature above the igniting point of the fuel to be consumed to start combustion, injecting fuel gradually into said air with high temperature in said vessel and said air admitted for combustion from the regenerating system, burning the fuel gradually as it is sprayed, further admitting a prescribed part of air from said regenerating system into the combustion vessel after the injection of fuel ceases therein to thereby further heat said air, expanding the combustion gases and said air, exhausting the combustion gases from said vessel, recompressing said air or part thereof to a degree to produce said high temperature to start combustion for the next combustion cycle in said vessel.

10. An internal slow burning combustion engine comprising: an air compressor, means for cooling said air compressor to thereby obtain a compression as close to the isothermal compression as possible, a regenerator for receiving the compressed air from said air compressor, passageways for compressed air and the exhaust gases provided in said regenerator, means for conducting the compressed air in said regenerator through spiral passageways provided around the combustion cylinder to thereby cool the combustion cylinder and for conducting the compressed air further through passageways to thereby heat the air externally by the exhaust gases, a combustion cylinder receiving the externally heated air from the regenerator for combustion of fuel, an inlet valve provided in said combustion cylinder in the connection from said regenerator to admit periodically the compressed and externally heated air after the external heating in the regenerator has taken place, means for burning fuel in said combustion cylinder at a slow burning condition, means for conducting the exhaust gases through said passageways in the regenerator.

MATHIAS HENTER.